(12) United States Patent
Parfenov et al.

(10) Patent No.: US 8,731,068 B2
(45) Date of Patent: May 20, 2014

(54) VIDEO TRANSCODER WITH FLEXIBLE QUALITY AND COMPLEXITY MANAGEMENT

(75) Inventors: Denis Vassilevich Parfenov, Moscow (RU); Pavel Aleksandrovich Aliseychik, Moscow (RU); Aleksey Alexandrovich Letunovskiy, Tokarevka (RU); Alexander Markovic, Media, PA (US); Ivan Leonidovich Mazurenko, Khimki (RU); Denis Vladimirovich Parkhomenko, Moscow (RU)

(73) Assignee: LSI Corporation, San Jose, CA (US)

( * ) Notice: Subject to any disclaimer, the term of this patent is extended or adjusted under 35 U.S.C. 154(b) by 423 days.

(21) Appl. No.: 13/069,552

(22) Filed: Mar. 23, 2011

(65) Prior Publication Data
US 2012/0051440 A1 Mar. 1, 2012

(30) Foreign Application Priority Data
Aug. 24, 2010 (RU) ................................ 2010135495

(51) Int. Cl.
*H04N 7/50* (2006.01)
(52) U.S. Cl.
USPC ............ 375/240.26; 375/240.01; 375/240.27; 375/240.28; 375/240.29
(58) Field of Classification Search
USPC .................. 375/240, 240.03, 240.13, 240.16, 375/240.29
See application file for complete search history.

(56) References Cited

U.S. PATENT DOCUMENTS

| | | | | |
|---|---|---|---|---|
| 5,870,146 A | * | 2/1999 | Zhu | 375/240.03 |
| 6,327,307 B1 | * | 12/2001 | Brailean et al. | 375/240.29 |
| 6,351,494 B1 | * | 2/2002 | Kondo et al. | 375/240.27 |
| 6,968,007 B2 | | 11/2005 | Barrau | |
| 7,142,601 B2 | * | 11/2006 | Kong et al. | 375/240.16 |

(Continued)

FOREIGN PATENT DOCUMENTS

EP 1257127 A2 11/2002

OTHER PUBLICATIONS

Yin, Peng, et al., "Drift Compensation for Reduced Spatial Resolution Transcoding," Circuits and Systems for Video Technology, IEEE Transactions on Video Technology, Nov. 2002, vol. 12, Issue 11, pp. 1009-1020.

(Continued)

*Primary Examiner* — Dave Czekaj
*Assistant Examiner* — Shanika Brumfield
(74) *Attorney, Agent, or Firm* — Mendelsohn, Drucker & Duleavy, P.C.; Yuri Gruzdkov; Steve Mendelsohn

(57) ABSTRACT

A video transcoder for converting a compressed input video bit-stream having one spatial resolution into a compressed output video bit-stream having a different spatial resolution in a manner that enables the transcoder to dynamically change the amount of computational resources allocated to the conversion process. In one embodiment, the video transcoder has a plurality of configurable processing paths whose configuration determines the amount of allocated computational resources. Exemplary processing-path configuration changes may include, but are not limited to engaging or disengaging a processing path, redirecting a data flow from flowing through one processing path to flowing through another processing path, and attaching or detaching one or more processing modules to an engaged processing path. The capability to make these and other configuration changes enables the video transcoder to adjust the computational complexity and picture quality on the fly, without interrupting the video sequence in the output video bit-stream.

20 Claims, 8 Drawing Sheets

(56) References Cited

U.S. PATENT DOCUMENTS

| | | | |
|---|---|---|---|
| 7,180,944 B2 | 2/2007 | Lin et al. | |
| 2002/0181579 A1* | 12/2002 | Vetro et al. | 375/240 |
| 2003/0016751 A1* | 1/2003 | Vetro et al. | 375/240.16 |
| 2003/0035488 A1* | 2/2003 | Barrau | 375/240.27 |
| 2006/0034370 A1* | 2/2006 | Park et al. | 375/240.03 |
| 2006/0083309 A1* | 4/2006 | Schwarz et al. | 375/240.16 |
| 2008/0095235 A1* | 4/2008 | Hsiang | 375/240.13 |
| 2008/0107185 A1 | 5/2008 | Lefol et al. | |
| 2010/0007534 A1 | 1/2010 | Girardeau, Jr. | |

OTHER PUBLICATIONS

Cock, Jan De, et al., "Efficient Spatial Resolution Reduction Transcoding for H.264/AVC," ICIP08, IEEE International Conference on Image Processing, Oct. 12-15, 2008, pp. 1208-1211.

Hong, Yong Taek, et al., "High Speed Architecture for MPEG-2/H.264 Video Transcoding," ISCIT '06., International Symposium on Communications and Information Technologies, Oct. 18-Sep. 20, 2006, pp. 674-678.

"Advanced video coding for generic audiovisual services," International Telecommunication Union, ITU-T Recommendation H.264, Series H: Audiovisual and Multimedia Systems, Infrastructure of audiovisual services—Coding of moving video, Nov. 2007 (564 pages).

Ahmad, Ishfaq, et al., "Video Transcoding: An Overview of Various Techniques and Research Issues," IEEE Transactions on Multimedia, vol. 7, No. 5, Oct. 2005, pp. 793-804.

Tagliasacchi, M., et al., "Intra Mode Decision Based on Spatio-Temporal Cues in Pixel Domain Wyner-Ziv Video Coding," in Proceedings of IEEE International Conference on Acoustics, Speech, and Signal Processing (ICASSP '06), vol. 2, 2006, pp. 57-60.

* cited by examiner

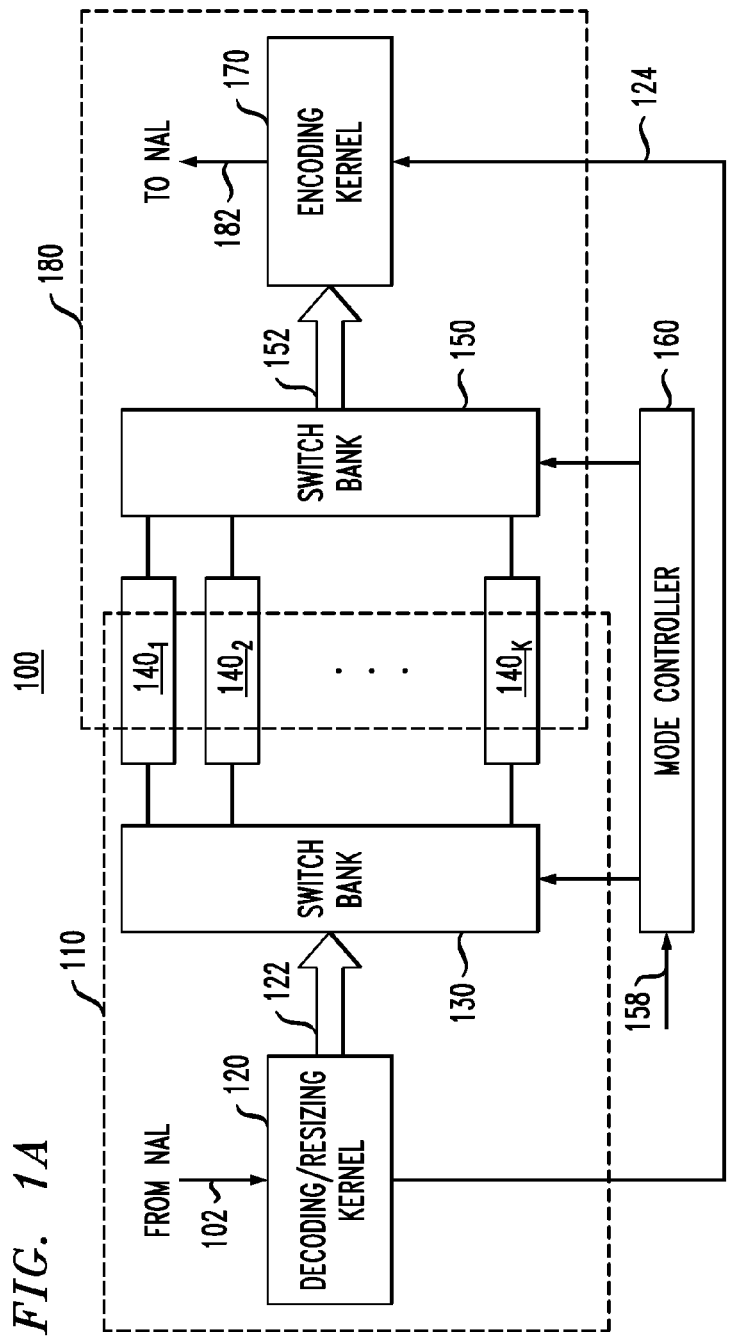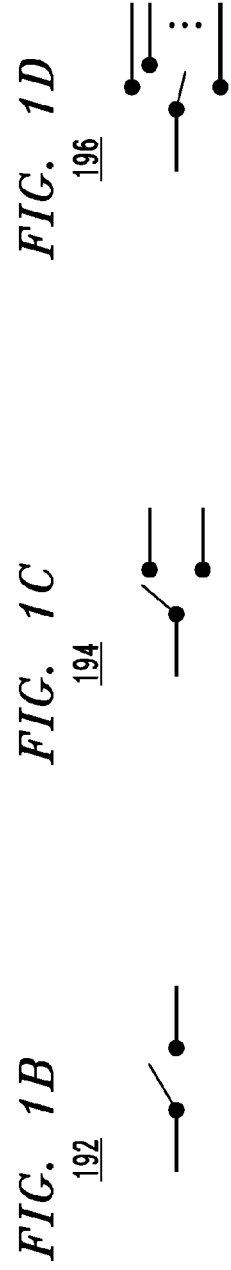

200

200

200

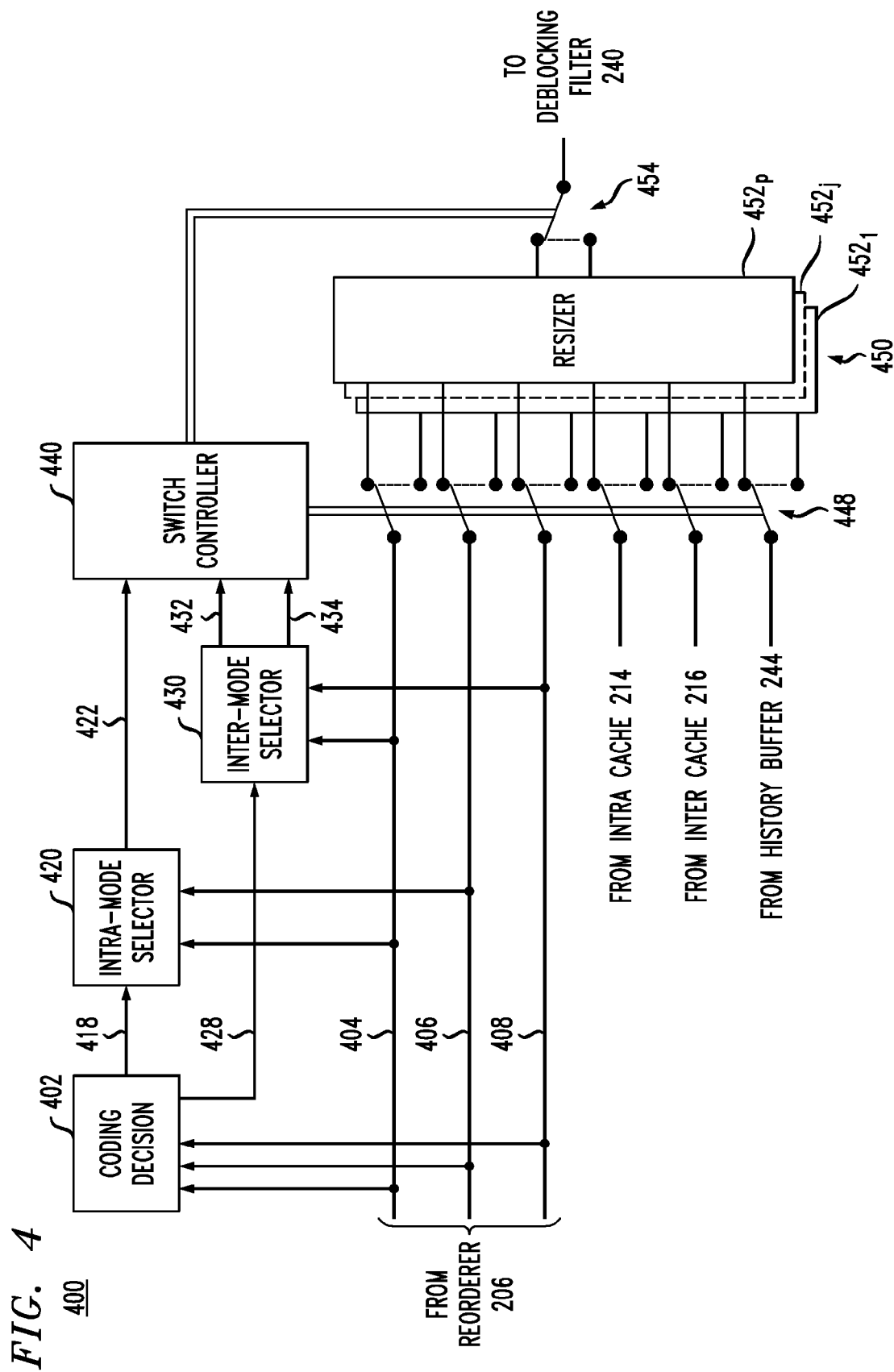

VIDEO TRANSCODER WITH FLEXIBLE QUALITY AND COMPLEXITY MANAGEMENT

CROSS-REFERENCE TO RELATED APPLICATIONS

The subject matter of this application is related to that of U.S. Patent Application Publication No. 2012/0051427, which is incorporated herein by reference in its entirety.

BACKGROUND

1. Field of the Invention

The present invention relates to video transcoding and, more specifically but not exclusively, to management of spatial resolution in compressed video bit-streams.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Video transcoding is a process of converting a previously compressed video bit-stream into another compressed video bit-stream, e.g., with a different bit rate, a different frame rate, a different display format, and/or a different coding method. For example, video transcoding can be used to convert a video bit-stream encoded in one standard into a video bit-stream encoded in a different standard, with the initial and final standards selected from a set consisting of the H.26x and MPEG-z families of standards, where x=1, 3, 4 and z=1, 2, 4. Another important example of video transcoding is conversion of a compressed video bit-stream having one spatial resolution into a compressed video bit-stream having a different (typically lower) spatial resolution, without changing the standard. Other video-transcoding operations may include adding enhanced error resilience, inserting logos and watermarks, adjusting temporal resolution, etc. Video transcoding advantageously enables multimedia devices of diverse formats and capabilities to exchange video content on heterogeneous transport-network platforms, such as the Internet.

A video transcoder can be physically placed at a transmitter, a receiver, or an intermediate node in the network. In realizing a video transcoder, the computational complexity and picture quality are usually the two most-important concerns. Another important concern is the ability to provide video transcoding on the fly, e.g., with real-time speed and without video-flow interruptions. However, accommodating these and other pertinent concerns can be a significant challenge, e.g., due to relatively large and fast variability of the network-traffic load and available transmission bandwidths.

SUMMARY

Disclosed herein are various embodiments of a video transcoder for converting a compressed input video bit-stream having one spatial resolution into a compressed output video bit-stream having a different spatial resolution in a manner that enables the transcoder to dynamically change the amount of computational resources allocated to the conversion process. In one embodiment, the video transcoder has a plurality of configurable processing paths whose configuration determines the amount of allocated computational resources. Exemplary processing-path configuration changes may include, but are not limited to engaging or disengaging a processing path, redirecting a data flow from flowing through one processing path to flowing through another processing path, and attaching or detaching one or more processing modules to or from an engaged processing path. The capability to make these and other configuration changes advantageously enables the video transcoder to adjust the computational complexity and picture quality on the fly, without interrupting the video sequence in the output video bit-stream.

An additional aspect of certain embodiments of the invention is that the transcoder is designed to demultiplex a partially decompressed input video stream into data segments suitable for intra-mode resizing, mixed-mode resizing, and inter-mode resizing. The transcoder uses three parallel channels to perform these resizing operations, which advantageously reduces the processing lag between the input and output video bit-streams. The mixed-mode resizing operation implemented in the transcoder is particularly effective in reducing the computational complexity of resizing the picture portions that have both intra- and inter-predicted blocks in close spatial proximity to one another.

According to one embodiment, provided is a method of resizing digital video having the step of processing a first compressed video bit-stream using a plurality of processing modules to generate a second compressed video bit-stream. The first compressed video bit-stream has a first spatial resolution. The second compressed video bit-stream has a different second spatial resolution. The method further has the step of changing a configuration of the plurality of processing modules to change an amount of computational resources allocated to said processing.

According to another embodiment, provided is an apparatus having (i) a decoding and resizing kernel configured to partially decompress a first compressed video bit-stream to generate partially decompressed video data; (ii) a plurality of processing modules configured to process the partially decompressed video data; and (iii) an encoding kernel configured to compress the partially decompressed data that have been processed by said plurality of processing modules to generate a second compressed video bit-stream. The first compressed video bit-stream has a first spatial resolution. The second compressed video bit-stream has a different second spatial resolution. The apparatus further has a controller operatively coupled to the plurality of processing modules and adapted to change a configuration of said plurality of processing modules in response to a request to change an amount of computational resources allocated by the apparatus to a process of generating the second compressed video bit-stream from the first compressed video bit-stream.

BRIEF DESCRIPTION OF THE DRAWINGS

Other aspects, features, and benefits of various embodiments of the invention will become more fully apparent, by way of example, from the following detailed description and the accompanying drawings, in which:

FIGS. 1A-1D depict a video transcoder according to one embodiment of the invention;

FIG. 4 shows a block diagram of a mixed-mode resizer that can be used in the transcoders shown in FIGS. 2-3.

DETAILED DESCRIPTION

Figure 2A:
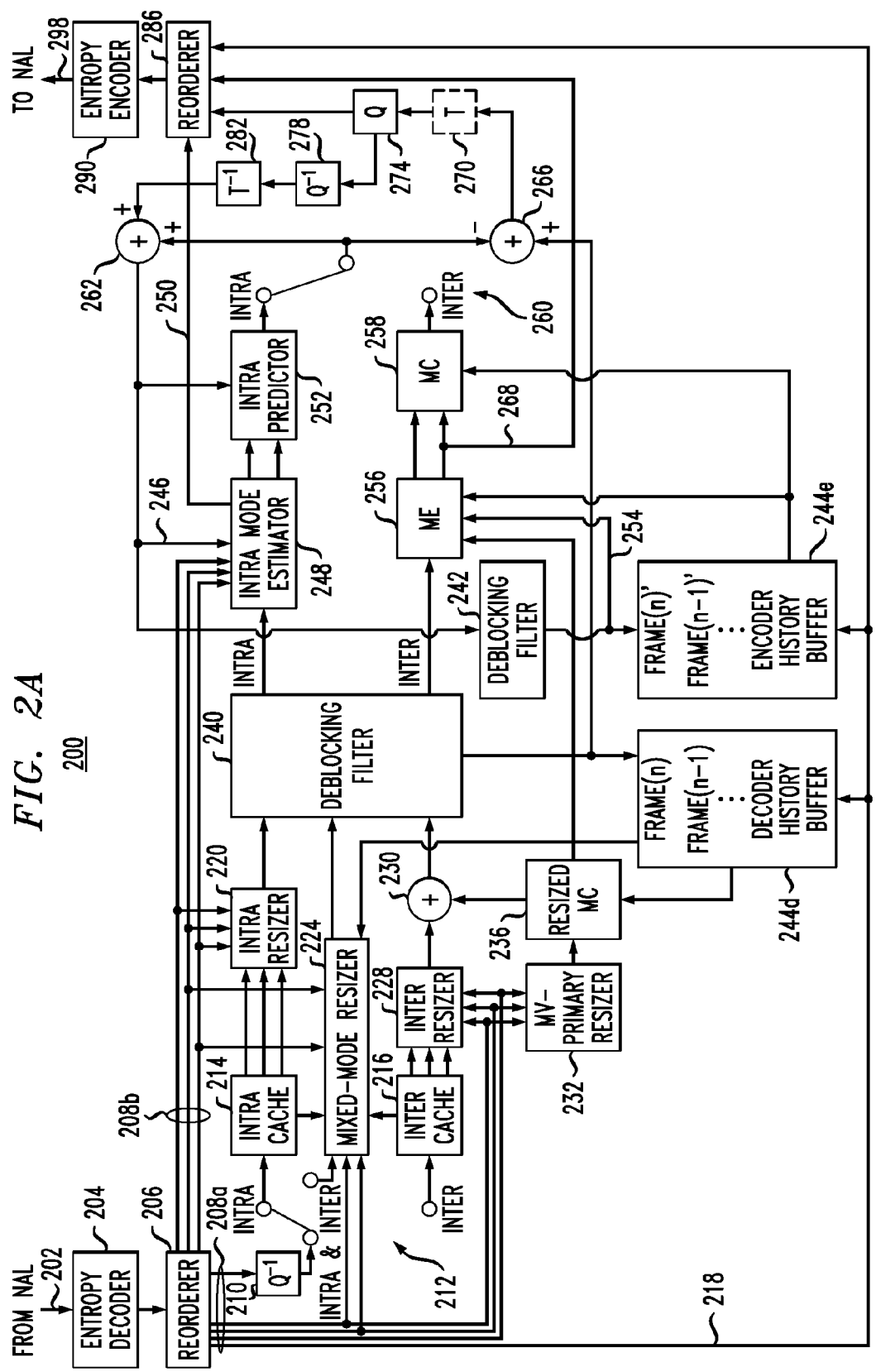
FIGS. 2A-2E show block diagrams of a video transcoder according to another embodiment of the invention.

FIGS. 1A-D illustrate a video transcoder 100 according to one embodiment of the invention. More specifically, FIG. 1A shows a block diagram of video transcoder 100. FIGS. 1B-D show representative logical switches 192, 194, and 196 that can be used in switch banks 130 and 150 of video transcoder 100. In various embodiments, video transcoder 100 can be implemented for being placed (i) at an end-terminal equipment package having a video camera, a transmitter, a receiver, and/or a video playback device or (ii) at an intermediate node in the transport network, such as a server, a gateway, or a multipoint control unit. For illustration purposes, video transcoder 100 is described below as if it were located at an intermediate node of a network. From this description, one of ordinary skill in the art will be able to make and use, without undue experimentation, an embodiment of video transcoder 100 suitable for being placed at an end-terminal equipment package.

Referring to FIG. 1A, video transcoder 100 receives an input video bit-stream 102 having a first spatial resolution from a Network Abstraction Layer (NAL), which layer provides transport services for compressed video bit-streams as known in the art. Video transcoder 100 processes input video bit-stream 102 as further described below to generate an output video bit-stream 182 having a second (different from the first) spatial resolution. Video bit-stream 182 is applied to the NAL for being transported to the intended receiver (not explicitly shown in FIG. 1A). Both input video bit-stream 102 and output video bit-stream 182 are compressed video bit-streams that comply with a specified standard, e.g., the H.264/AVC standard, more details on which can be found in ITU-T Recommendation H.264 (11/2007), which is incorporated herein by reference in its entirety.

In one embodiment, video transcoder 100 performs planar image-size transformation from an original size/resolution (e.g., Y1 by Y2 pixels) to a target size/resolution (e.g., Z1 by Z2 pixels), where Z1=kY1, Z2=kY2, and k is a scaling factor (SF). Typically, the scaling factor is between zero and one (0<k<1) and can be represented as a simple fraction, k=M/N, where M and N are positive integers. Depending on the particular design objectives, different sets of M and N values can be used. The use of a few, relatively small M and N values enables a significant reduction in the computational complexity, but restricts the number of available SF values. The use of many and/or relatively large M and N values supports image transformation for a greater variety of original and target display sizes at the expense of increased computational complexity.

In various embodiments of video transcoder 100, M and N can be selected to achieve an acceptable compromise between the computational complexity and image-size flexibility. To employ relatively small M and N, and yet be able to cover a satisfactory range of target display sizes and shapes, video transcoder 100 may be configured to (i) delete several peripheral rows and/or columns of pixels in the original picture and/or (ii) add several empty (e.g., black) peripheral rows and/or columns of pixels in the target picture. In one configuration, the following relationship between the original and target sizes can be implemented: Z1=M/N Y1+b1 and Z2=M/N Y2+b2, where b1 and b2 are constants that determine the numbers of empty peripheral rows and columns, respectively. For example, to convert an image that has 960×720 pixels to an image that has 352×288 pixels, video transcoder 100 can be configured to use M=1, N=3, b1=32, and b2=48. For processing color images, substantially analogous processing can be performed for each of the constituent picture components (e.g., in the YCbCr color space) using the corresponding parallel processing channels. Depending on the particular embodiment, these parallel channels may or may not have the same architecture of the decision/control logic, such as switch configurations, mode-selection controls, etc.

Video transcoder 100 can conceptually be viewed as having a decoder portion 110 and an encoder portion 180. Decoder portion 110 and encoder portion 180 overlap as indicated in FIG. 1A and, as such, may have one or more shared elements. Decoder portion 110 performs partial decompression and decoding of input video bit-stream 102 using a decoding/resizing kernel 120. The data generated by decoding/resizing kernel 120 are applied, via a data bus 122 and switch bank 130, to a plurality of processing paths $140_1$-$140_K$, where K is a positive integer greater than one. The output data generated by processing paths $140_1$-$140_K$ are then applied, via switch bank 150 and a data bus 152, to an encoding kernel 170 of encoder portion 180. Based on the data received through data bus 152 and a bypass signal 124 received directly from decoding/resizing kernel 120, encoding kernel 170 generates output video bit-stream 182.

Each of switch banks 130 and 150 can generally be implemented using any desirable combination of logical switches 192, 194, and 196 shown in FIGS. 1B-D, respectively. Different instances (copies) of each particular logical switch may be configured for being traversed by the corresponding signals in different directions. For example, one or more instances of logical switch 194 may be configured for being traversed from left to right in the view presented in FIG. 1C, while one or more other instances of logical switch 194 may be configured for being traversed from right to left. Similarly, one or more instances of logical switch 196 may be configured for being traversed from left to right in the view presented in FIG. 1D, while one or more other instances of logical switch 196 may be configured for being traversed from right to left.

Video transcoder 100 has a mode controller 160 that controls the states of individual logical switches 192, 194, and 196 in switch banks 130 and 150. Using one or more logical switches 192 (FIG. 1B), mode controller 160 can controllably engage or disengage the corresponding processing path 140 connected to the switch(es). Using one or more logical switches 194 (FIG. 1C), mode controller 160 can controllably change a data flow from flowing through a first processing path 140 connected to the switch(es) to flowing through a second processing path 140 connected to the switch(es). Similarly, using one or more logical switches 196 (FIG. 1D), mode controller 160 can controllably change a data flow from flowing through one processing path 140 connected to the switch(es) to flowing through another processing path 140 connected to the switch(es), wherein logical switch 196 is connected to three or more different processing paths 140.

Mode controller 160 configures individual logical switches 192, 194, and/or 196 in switch banks 130 and 150 in accordance with a selected operating mode and/or based on a received request 158 to change the amount of computational resources allocated by the host device to the process of generating output bit-stream 182 from input bit-stream 102. Different operating modes of video transcoder 100 differ from one another by the allocated amount of processing power per video frame and the peak signal-to-noise ratio (PSNR) in the resized target-resolution image. In general, any desired number of operating modes (e.g., two or more) can be realized. However, for practical reasons, the number of operating modes may be limited to fewer than ten, e.g., five operating modes numbered zero to four.

For example, Mode 0 may be designed to provide the highest PSNR at the expense of taking up a relatively large amount of computational resources, e.g., processor time and memory utilization. Mode 1 may save processor time and reduce memory (e.g., RAM) demand compared to that of Mode 0 at the expense of producing higher levels of residual errors and the corresponding lower PSNR values. Modes 2 through 4 may further decrease computational efforts and RAM requirements in a gradual manner, e.g., by disengaging an increasingly larger number of different processing paths 140 and/or processing modules. The resulting truncated processing produces commensurate reductions in the PSNR and image quality.

In one embodiment, mode controller 160 initiates mode transitions based on the total amount of available processing power and memory in the host device, e.g., an intermediate network node having video transcoder 100. The total amount of available processing power and memory in the host device may fluctuate over time, e.g., due to the demand imposed on the computational resources of the host device by other processes/tasks. If such demand is relatively low, then mode controller 160 may put video transcoder 100 in Mode 0. If such demand increases, then mode controller 160 may gradually transition video transcoder 100 from Mode 0 to one of the operating modes selected from Modes 1 through 4 to better match the available computational resources. Subsequently, if the demand on the computational resources of the host device decreases, then mode controller 160 may gradually shift the operating mode of video transcoder 100 back toward Mode 0.

Advantageously, the ability of video transcoder 100 to dynamically engage, disengage, configure, and reconfigure various processing paths 140 allows the video transcoder to change the operating modes and therefore the picture quality in output video bit-stream 182 on the fly, without interrupting the video sequence in the output video bit-stream. More specifically, while an operating mode is being changed, video transcoder 100 continues to process the incoming sequence of video frames of bit-stream 102 to produce a corresponding sequence of video frames for bit-stream 182 so that no incoming video frame is being skipped, discarded, or dropped without being resized due to the concomitant change in the configuration of processing paths 140. In addition, certain mode transitions can be implemented without changing the data flow at all. For example, attaching certain additional processing modules to one or more already active processing paths 140 can be used to increase the processing complexity and improve the picture quality without changing the overall data flow between decoding/resizing kernel 120 and encoding kernel 170. Similarly, detaching certain processing modules from one or more active processing paths 140 without fully disengaging said processing path(s) can be used to decrease the processing complexity and lower the picture quality without a change in the overall data flow. Furthermore, certain embodiments of the invention may employ reconfigurable processing modules that enable the system to change the amount of computational resources allocated to video transcoder 100 solely through internal reconfiguration of such modules, without changing the number or external logical connections of the modules in the corresponding processing paths. Such internal reconfiguration can be performed, e.g., by changing an algorithm that is being run by the processing module in question and/or by varying the algorithm's parameters.

FIGS. 2A-E illustrate a video transcoder 200 according to another embodiment of the invention. More specifically, each of FIGS. 2A-E shows a configuration of video transcoder 200 in the corresponding operating mode. The operating modes are numbered 0 through 4, with Mode 0 being the most computationally complex mode, Mode 4 being the least computationally complex mode, and Modes 1 through 3 having different intermediate levels of computational complexity. Video transcoder 200 is generally analogous to video transcoder 100 and has switch banks that are analogous to switch banks 130 and 150 (FIG. 1). However, for clarity of description, the individual logical switches and switch banks are not explicitly shown in FIGS. 2A-E.

FIG. 2A shows a block diagram of video transcoder 200 according to its full functionality in Mode 0. Each of FIGS. 2B-E shows a block diagram of video transcoder 200 according to its reduced functionality in Modes 1-4, respectively. The functional blocks and modules of video transcoder 200 corresponding to the processing paths that are disengaged in Modes 1-4 are omitted (not explicitly shown) in the corresponding figures for clarity.

Referring to FIG. 2A, a compressed video bit-stream 202 received from the NAL is applied to an entropy decoder 204. As known in the art, entropy coding maps parameter values representing motion vectors, quantized coefficients, prediction information, and block headers into actual transmittable bits so that a smaller number of bits is assigned to more-frequently used values and a greater number of bits is assigned to less-frequently used values. Representative types of entropy coding are Variable Length Coding (VLC) and Context Adaptive Binary Arithmetic Coding (CABAC). The H.264/AVC standard also supports Context Adaptive Variable Length Coding (CAVLC). In various embodiments, entropy decoder 204 can operate based on these and other suitable types of entropy coding.

The output of entropy decoder 204 is applied to a sorting and reordering module (reorderer) 206. Reorderer 206 reorders the data received from entropy decoder 204 to put them in appropriate time sequence and sorts various data items by their type. The data need to be reordered in reorderer 206, e.g., because certain video frames may be coded, transmitted, and/or received out of their natural time sequence. Representative data-item types to be sorted may include but are not limited to (i) reference blocks, (ii) intra-prediction modes, (iii) blocks with residuals, (iv) quantization information corresponding to the blocks listed in (iii); (v) motion vectors (MVs), and (vi) reference-block dismissal information. Reorderer 206 outputs each data type on a corresponding output line of data busses 208a-b. For example, reorderer 206 directs quantized data items to an inverse quantizer ($Q^{-1}$) 210, where said data items are subjected to inverse quantization as known in the art. Reorderer 206 and inverse quantizer 210 feed three parallel resizing channels: an intra-mode resizing channel, a mixed-mode resizing channel, and an inter-mode resizing channel. These three resizing channels are used for generating target-resolution blocks from original-resolution blocks while taking into account the types of prediction employed in the corresponding original-resolution frames. More specifically, the intra-mode resizing channel, which is represented by an intra-cache memory 214 and an intra resizer 220, deals with intra-predicted blocks. As known in the art, intra prediction is a process of predicting pixels in a block based on previously coded data corresponding to the neighboring blocks from the same video frame. The inter-mode resizing channel, which is represented by an inter-cache memory 216, an inter resizer 228, and an MV-primary resizer 232, deals with inter-predicted blocks. As known in the art, inter prediction is a process of predicting pixels in a current frame from similar regions in one or more previously coded frames.

The mixed-mode resizing channel, which is represented by a mixed-mode resizer 224, deals with instances of frames for which a target-resolution block corresponds to a portion of the original-resolution image that has both an inter-predicted block and an intra-predicted block. A demultiplexer switch 212 is used to de-multiplex the various data blocks or data segments that appear at the output of inverse quantizer 210 and direct them to the appropriate one of the three resizing channels. As used herein, the term "data segment" refers to a basic unit of data that can be processed, alone or in combination with one or more other "data segments" by the intended receiving processing module, channel, or path. In various embodiments, the data segments directed by demultiplexer switch 212 to the intra-mode resizing channel, the mixed-mode resizing channel, and the inter-mode resizing channel may or may not have the same structure. Note that all three resizing channels are used in each of Modes 0 through 4 (see FIGS. 2A-2E, respectively), even though the channel-implementation complexity may depend on the particular operating mode. Advantageously, the intra-mode resizing channel, the mixed-mode resizing channel, and the inter-mode resizing channel can operate in parallel on the respective streams of demultiplexed data, thereby reducing the processing delay and the lag between compressed input video bit-stream 202 and a compressed output video bit-stream 298.

In one embodiment, the intra-mode resizing channel, the mixed-mode resizing channel, and the inter-mode resizing channel operate in the transform domain. For this embodiment, a DCT (discrete cosine transform; labeled T in FIG. 2) module 270, located in the encoder portion of transcoder 200 and shown using a dashed line, is omitted. In an alternative embodiment, the intra-mode resizing channel, the mixed-mode resizing channel, and the inter-mode resizing channel operate in the spatial domain. For this embodiment, DCT module 270 is not omitted, and each of the three resizing channels incorporates or is preceded by an inverse DCT module (not explicitly shown in FIG. 2).

In the description that follows, the inter-mode resizing channel is described first, the intra-mode resizing channel is described second, and the mixed-mode resizing channel is described third. In the encoder portion of transcoder 200, which is located in the view of FIG. 2A to the right of a deblocking filter 240 and a decoder-history buffer 244*d*, the processing corresponding to the intra-mode, mixed-mode, and inter-mode resizing channels becomes convoluted. For example, the mixed-mode resizing channel terminates in the decoder portion of transcoder 200 while feeding its processing results into the extensions of inter- and intra-mode resizing channels. Due to these and other pertinent design features of transcoder 200, the description below of one resizing channel may refer to certain elements of another resizing channel. This cross-referencing of the resizing channels in the description should not be construed to improperly attribute circuit elements corresponding to the convoluted portions and extensions of the resizing channels exclusively to one or the other resizing channel.

Mixed-mode resizer 224, inter resizer 228, and MV-primary resizer 232 are configured to receive MV data directly from reorderer 206, via bus 208*a*. Based on the received MV data, MV-primary resizer 232 searches for a best fit to the MV-data aggregate at the target resolution. The MV-data aggregate represents the dominating motion among the corresponding (e.g., 4×4) blocks to be fused in the resizing operation, and the best fit is an MV corresponding to that dominant motion. While generating said best fit, MV-primary resizer 232 takes into account relative temporal lags and scales the resulting dominant MV using an appropriate scaling factor (SF, k). The scaled dominant MV is fed to a resized-MC module 236 and an ME engine 256, with MC and ME standing for motion compensation and motion estimation, respectively. As known in the art, motion compensation comprises a step of subtracting an inter-predicted block from the corresponding reference block to generate residuals. Motion estimation comprises a step of finding a suitable inter prediction, e.g., a reference block and a corresponding motion vector. Both resized-MC module 236 and ME engine 256 use the scaled dominant MV received from MV-primary resizer 232 as an initial guess for further MV search and refinement, e.g., based on residual-error minimization. The use of the scaled dominant MV in resized-MC module 236 and ME engine 256 advantageously makes the search and refinement performed thereafter less computationally intense and more efficient.

ME engine 256 also receives (i) target-resolution blocks corresponding to formerly intra-predicted blocks from deblocking filter 240, (ii) reference blocks from an encoder-history buffer 244*e*, and (iii) a feedback signal 254 generated by a feedback loop comprising an MC module 258, an adder 266, optional DCT module 270, a quantizer (Q) 274, an inverse quantizer ($Q^{-1}$) 278, an IDCT (inverse DCT; labeled $T^{-1}$ in FIG. 2A) module 282, an adder 262, and a deblocking filter 242. ME engine 256 uses these inputs in general and feedback signal 254 in particular to (i) iteratively find optimal MVs that minimize the residual energy and temporal drift for series of inter-coded target-resolution blocks and (ii) decrease visual artifacts caused, e.g., by (a) the process of fusing two or more blocks of original resolution into a single block of target resolution and (b) the inherent precision loss due to the quantization and the DCT transform. The feedback loop implements a so-called "reconstruction path," which serves, e.g., to minimize the residual errors and reduce blocking distortions and distortions associated with DCT and quantization. For example, deblocking filter 242 filters the blocks received from adder 262 before storing them as reference blocks in encoder history buffer 244*e* for MV refinement and future predictions to achieve at least the following two benefits: (1) block edges are smoothed, thereby improving the appearance of decoded images, particularly at higher compression ratios, and (2) the filtered blocks can be used for motion compensation in further frames, which results in a smaller residual error after the inter prediction. Note that the feedback-loop processing may include two or more feedback-loop cycles, with the results of this feedback-loop processing being stored/updated in encoder-history buffer 244*e* after each of the feedback-loop cycles.

Inter resizer 228 receives inter-predicted blocks from inverse quantizer 210 via demultiplexer switch 212 and inter-cache memory 216. Recall also that inter resizer 228 receives MV data from reorderer 206. Due to having access to multiple relevant inter-predicted blocks in inter-cache memory 216, inter resizer 228 is able to perform a residual-error joining operation for various blocks that are being fused to form the corresponding target-resolution blocks in a relatively efficient manner. More specifically, inter resizer 228 scales down (or up) the original blocks of residuals retrieved from inter-cache 216 while appropriately fusing them to obtain resized blocks of residuals for subsequent reconstruction of the corresponding image blocks in an adder 230. Adder 230 directs the reconstructed image blocks to deblocking filter 240.

Intra resizer 220 is coupled to inverse quantizer 210 in a manner similar to that of inter resizer 228. More specifically, intra resizer 220 receives intra-predicted and reference blocks from inverse quantizer 210 not directly, but via demultiplexer switch 212 and intra-cache memory 214. Demultiplexer switch 212 selects the reference blocks intended for intra prediction in the output of inverse quantizer 210 and directs them to intra-cache memory 214, where these blocks are temporarily stored for further processing in intra resizer 220. Intra resizer 220 also receives the original-resolution intra modes directly from reorderer 206 via bus 208b. Intra resizer 220 retrieves sets of related blocks from intra-cache memory 214, optionally performs an inverse DCT operation on them, removes intra-coding from the intra-predicted blocks, and fuses the resulting original-resolution blocks to form the corresponding target-resolution blocks. These target-resolution blocks are then directed to deblocking filter 240.

An intra-mode estimator 248 receives (i) the original-resolution intra modes directly from reorderer 206 via bus 208b, (ii) target-resolution blocks intended for intra prediction from deblocking filter 240, and (iii) a feedback signal 246 generated by a feedback loop having an intra predictor 252, adder 266, embodiment-specific DCT module 270, quantizer 274, inverse quantizer 278, and IDCT module 282. Intra-mode estimator 248 uses these inputs in general and feedback signal 246 in particular to produce a reduced set of refined intra modes at the target resolution. More specifically, feedback signal 246 is used both to decrease compression artifacts (e.g., by minimizing the residual energy) and to find more-precise intra modes. Note that the feedback loop that generates feedback signal 246 for intra-mode estimator 248 shares certain elements with the feedback loop that generates feedback signal 254. A multiplexer switch 260 is used to appropriately engage the shared elements to enable appropriate signal processing by each of these two feedback loops. As already indicated above, an original-resolution video frame may have both intra- and inter-predicted blocks. Such frames may be routinely encountered when certain advanced video-coding techniques are used, such as some of the coding techniques specified in the H.264/AVC standard. When an inter-predicted block and an intra-predicted block are located in relatively close spatial proximity to one another in the original-resolution video frame, a resolution change effected by the transcoder may cause these blocks to have to be fused together into a single block at the target resolution. In fact, there may exist a rather large number of possible geometrical combinations of such blocks and the corresponding inter- and intra-prediction modes. For example, for k=⅓, there are more than $6 \cdot 10^8$ possible geometrical combinations, which makes constructing the corresponding ad hoc mixed-mode resizers impractical. Mixed-mode resizer 224 addresses this problem in transcoder 200 as further described below.

Mixed-mode resizer 224 is designed to decode co-located intra- and inter-predicted blocks and fuse them together to form a corresponding target-resolution block. In one embodiment, the output format employed by mixed-mode resizer 224 is the same as the output format employed by inter-resizer 228 and intra resizer 220. While processing co-located intra- and inter-predicted blocks, mixed-mode resizer 224 makes a decision on whether intra coding or inter coding is more beneficial for the fused target-resolution block(s). Mixed-mode resizer 224 can make this decision, e.g., based on intra-mode residuals, the MV data, and inter-mode residuals received from intra-cache memory 214, reorderer 206, and inter-cache memory 216, respectively. For example, if the MVs corresponding to the inter-predicted blocks are approximately co-directional and the inter-predicted blocks dominate over the intra-predicted blocks, then inter-prediction coding with one or more corresponding reference blocks is chosen for the target resolution. If the inter-predicted blocks do not dominate, then intra-prediction coding may be chosen for the corresponding target-resolution block(s). A mixed-mode resizer that can be used as mixed-mode resizer 224 is described in more detail below in reference to FIG. 4.

Deblocking filter 240 receives resized blocks and other relevant data from each of the intra-mode resizing channel, the mixed-mode resizing channel, and the inter-mode resizing channel, e.g., as indicated in FIG. 2A. Deblocking filter 240 operates on the received data to (i) remove all inter- and intra-prediction coding and (ii) reduce visual artifacts originated from motion compensation and block fusing and resizing to target resolution. The processed blocks corresponding to formerly intra-predicted blocks are supplied to intra-mode estimator 248 for intra-prediction processing and data compression at the target resolution. Similarly, the processed blocks corresponding to formerly inter-predicted blocks are supplied to ME engine 256 for inter-prediction processing and data compression at the target resolution. Some or all of the processed blocks are also temporarily stored in decoder-history buffer 244d. These stored blocks can be retrieved from decoder-history buffer 244d by resized-MC module 236 and mixed-mode resizer 224 and used thereat as reference blocks for motion tracking.

Decoder-history buffer 244d is partially or fully purged as appropriate or necessary to delete the blocks that are no longer useful for their intended purposes. For example, a block-dismissal command 218 generated by reorderer 206 can be used to set an expiration time for the blocks stored in both history buffers 244d and 244e. In a representative configuration, the expiration time for a set of blocks used for inter- and/or intra-prediction processing may correspond to the latest time at which any block in the set is expected to be retrieved from history buffers 244d and 244e for said processing. Block-dismissal command(s) 218 notify the buffer controller (not explicitly shown in FIG. 2) when certain reference blocks can be purged from history buffers 244, thereby enabling the history buffers to advantageously have a smaller overall size than without the use of the block-dismissal command(s).

The use of two separate history buffers, i.e., history buffers 244d and 244e, for the decoder and encoder portions, respectively, of transcoder 200 serves to optimize motion estimation and motion compensation for the generation of compressed output video bit-stream 298. More specifically, history buffers 244d and 244e receive and store data corresponding to the same blocks, with the same resolution, but with different levels of residual errors, wherein each of the levels is more beneficial for the intended data usage than the other. For example, decoder history buffer 244d receives and stores relatively high-quality blocks that have not been subjected to distortion due to DCT and/or quantization. These blocks are used, e.g., when ME engine 256 attempts to approximate them at target resolution. Similarly, encoder-history buffer 244e contains the current approximation of the contents of decoder-history buffer 244, wherein said approximation takes into account DCT-, quantization-, and ME-induced aberrations. An added benefit of employing the two history buffers instead of one is that the relatively large amount of data transfers to various locations within transcoder 200 is split between two different sets of memory banks, which alleviates the disadvantageously heavy data-transfer load that a single set of memory banks would otherwise encounter.

A reorderer 286 receives: (i) the optimized intra mode(s), via line 250, directly from intra-mode estimator 248, (ii) the optimized motion vector(s), via line 268, directly from ME engine 256, (iii) block dismissal commands 218, and (iv) quantized blocks of residuals from quantizer 274. The quantized blocks of residuals are generated after adder 266 generates blocks of residuals corresponding to the optimized intra mode(s) and motion vector(s) and directs these blocks to optional DCT module 270 and/or to quantizer 274. Based on the received inputs, reorderer 286 assembles a corresponding sequence of data segments for an entropy encoder 290.

Entropy encoder 290 applies entropy coding to the received data segments to generate output video bit-stream 298 for the NAL.

Figure 2B:
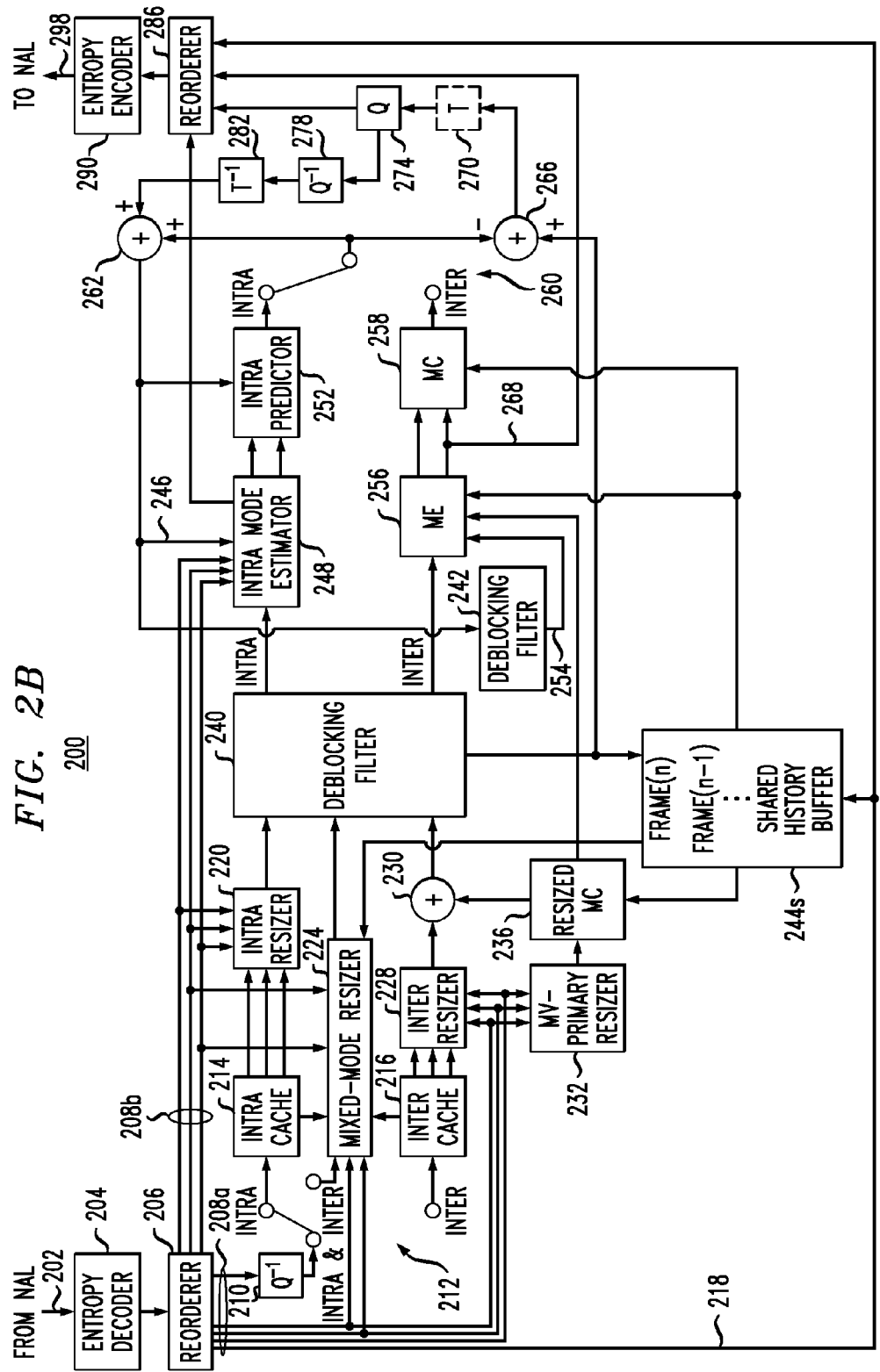

FIG. 2B shows a block diagram of video transcoder 200 according to its reduced functionality in Mode 1. One difference between the configurations shown in FIGS. 2B and 2A is that encoder-history buffer 244e (FIG. 2A) is now disengaged. Also, decoder-history buffer 244d (FIG. 2A) is now connected to ME engine 256 and MC module 258 and is renamed a shared-history buffer 244s (FIG. 2B). These configuration changes can be made on the fly, without affecting the data flow in transcoder 200 or producing any interruptions in the video sequence of output video bit-stream 298.

Encoder-history buffer 244e can be disengaged in Mode 1 substantially without any loss of functionality because, as already indicated above, encoder-history buffer 244e and decoder-history buffer 244d have similar contents. Therefore, the video blocks stored in decoder-history buffer 244d can be used as an approximation of the corresponding blocks stored in encoder-history buffer 244e. Since this approximation is inherently different from the blocks used for the same purpose in Mode 0, a reconfiguration of transcoder 200 into Mode 1 causes a drop in video quality for output video bit-stream 298.

While transcoder 200 operates in Mode 1, both ME engine 256 and MC module 258 receive reference blocks from shared-history buffer 244s. Motion-compensated reference blocks produced by MC module 258 undergo feedback-loop processing as already described above for Mode 0, and the processed blocks come back to ME engine 256 via feedback signal 254. As in Mode 0, feedback signal 254 enables ME engine 256 to optimize the corresponding motion vectors while taking into account MC-, DCT-, and quantization-originated errors induced in the encoder portion of transcoder 200. However, unlike in Mode 0, MC module 258 implements a motion-compensation scheme in which the blocks of residuals are computed based on reference blocks that have not been refined to take into account the quantization- and/or DCT-originated errors. The latter characteristic of Mode 1 leads to an incremental quality drop compared Mode 0, but reduces the amount of required memory almost by a factor of two because history buffers 244d and 244e typically have a much larger size than cache memories 214 and 216. In addition, less precise and therefore less computationally taxing motion-estimation algorithms can now be employed in ME engine 256 without a noticeable detrimental effect on the video quality provided by output video bit-stream 298.

Figure 2C:
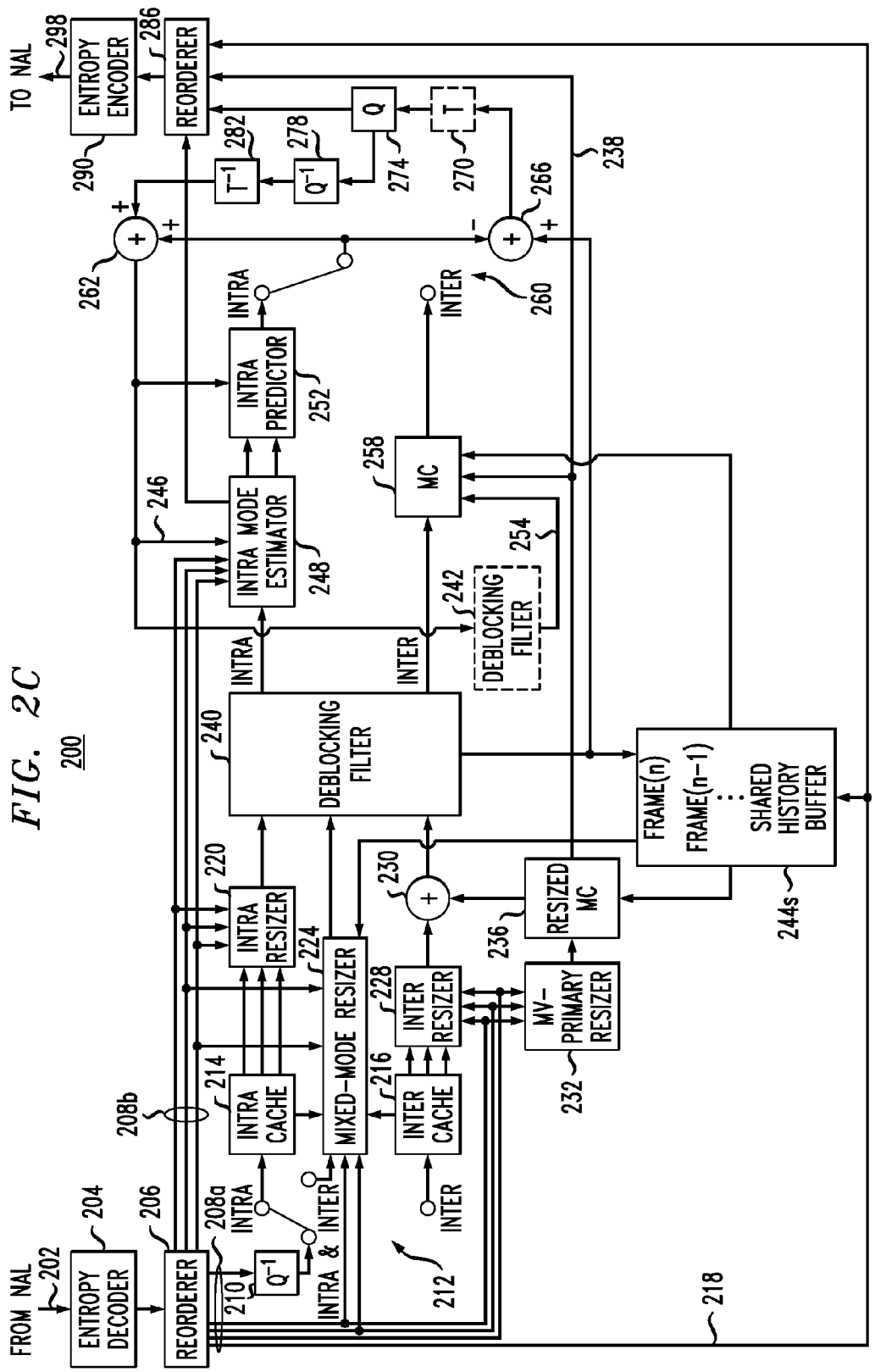

FIG. 2C shows a block diagram of video transcoder 200 according to its reduced functionality in Mode 2. One difference between the configurations shown in FIGS. 2C and 2B is that ME engine 256 (FIG. 2B) is disengaged. The motion-compensation feedback loop is reconfigured so that (1) feedback signal 254 generated by said feedback loop is applied to MC module 258 and (2) the motion vectors produced by primary-MV resizer 232 are passed by resized MC module 236 via line 238 directly to reorderer 286. Since the motion vectors produced by primary-MV resizer 232 are less accurate than the motion vectors produced by ME engine 256, the blocks of residuals directed by adder 266 toward reorderer 286 have a greater residual energy than in Mode 1, which results in a concomitant quality drop for output video bit-stream 298.

As an additional means of reducing the computational complexity in Mode 2, deblocking filter 242 may be optionally disengaged. The optional nature of this disengagement is indicated in FIG. 2C by the dashed line that shows the outline of deblocking filter 242. Although the disengagement of deblocking filter 242 can lead to certain visual artifacts in output video bit-stream 298, the additional video-quality drop corresponding to these artifacts is not very significant and the resulting video quality may still be considered to remain within the general bounds of the video quality designated for Mode 2.

Figure 2D:
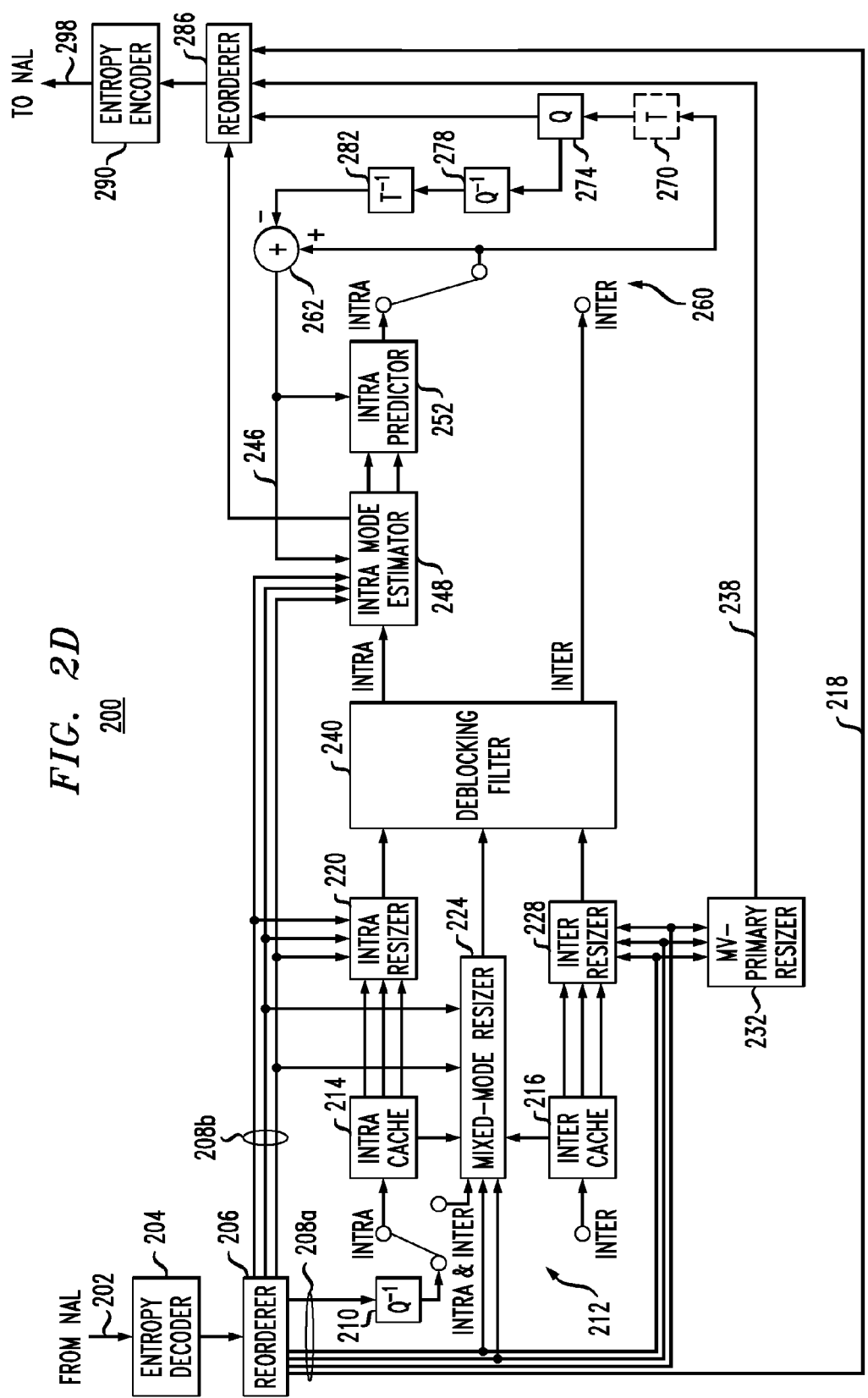

FIG. 2D shows a block diagram of video transcoder 200 according to its reduced functionality in Mode 3. One significant difference between the configurations shown in FIGS. 2D and 2C is that the motion-compensation feedback loop is now disengaged, thereby producing an open-MC-loop configuration. More specifically, MC module 258 is bypassed and excluded from the path between deblocking filter 240 and multiplexer 260. As a result, no DCT- and/or quantization-induced error compensation is performed for inter-predicted blocks in the encoder portion of transcoder 200. Similar to other open-loop architectures, the opening of the MC-feedback loop in Mode 3 of transcoder 200 may cause some temporal drift in the video provided by output video bit-stream 298.

Another difference is that shared history buffer 244s is disengaged. This disengagement causes mixed-mode resizer 224 to perform a simplified version of mixed-mode resizing processing with less precise or completely disabled motion compensation. Resized-MC module 236 and adder 230 are disengaged. Adder 266 is bypassed, and adder 262 is reconfigured from performing a "sum" operation to performing a "subtraction" operation. As a result, in Mode 3, deblocking filter 240 receives and processes blocks of residuals directly from inter resizer 228, as opposed to receiving reconstructed inter-predicted target-resolution blocks from adder 230 in Mode 2.

Figure 2E:
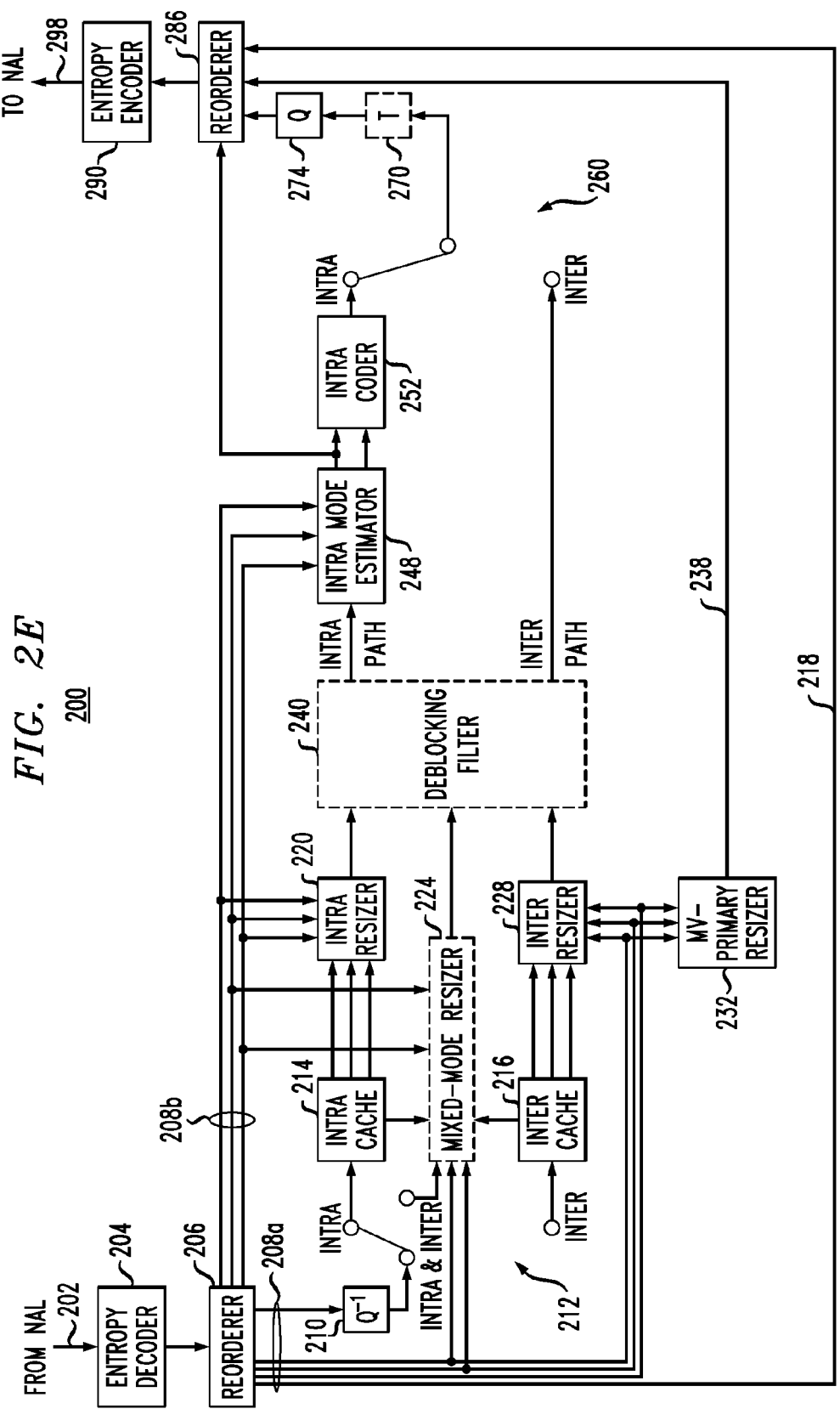

FIG. 2E shows a block diagram of video transcoder 200 according to its reduced functionality in Mode 4. One significant difference between the configurations shown in FIGS. 2E and 2D is that the intra-prediction feedback loop (see, e.g., feedback signal 246 in FIG. 2D) is disengaged. This disengagement is achieved by disconnecting adder 262, IDCT module 282, and inverse quantizer 278. Also, an intra-coder module 253 replaces, in the configuration of FIG. 2E, the intra-predictor module 252 of FIG. 2D. Intra-coder module 253 does not need or use a feedback signal from an intra-prediction feedback loop and, as such, implements a simpler version of intra-prediction coding. Intra-mode estimator 248 is also reconfigured to operate based solely on the inputs received from the decoder portion of transcoder 200 and without feedback signal 246.

As an additional means of reducing the computational complexity in Mode 4, deblocking filter 240 may be optionally disengaged and replaced by an interconnect switch (not explicitly shown). A main function of the interconnect switch is to properly route the resized blocks generated by mixed-mode resizer 224 to either the intra-prediction path or the inter-prediction path, which paths are labeled "intra path" and "inter path," respectively, in FIG. 2E. The optional nature of the disengagement of deblocking filter 240 is indicated in FIG. 2E by the dashed line that shows the outline of the deblocking filter.

Figure 3:
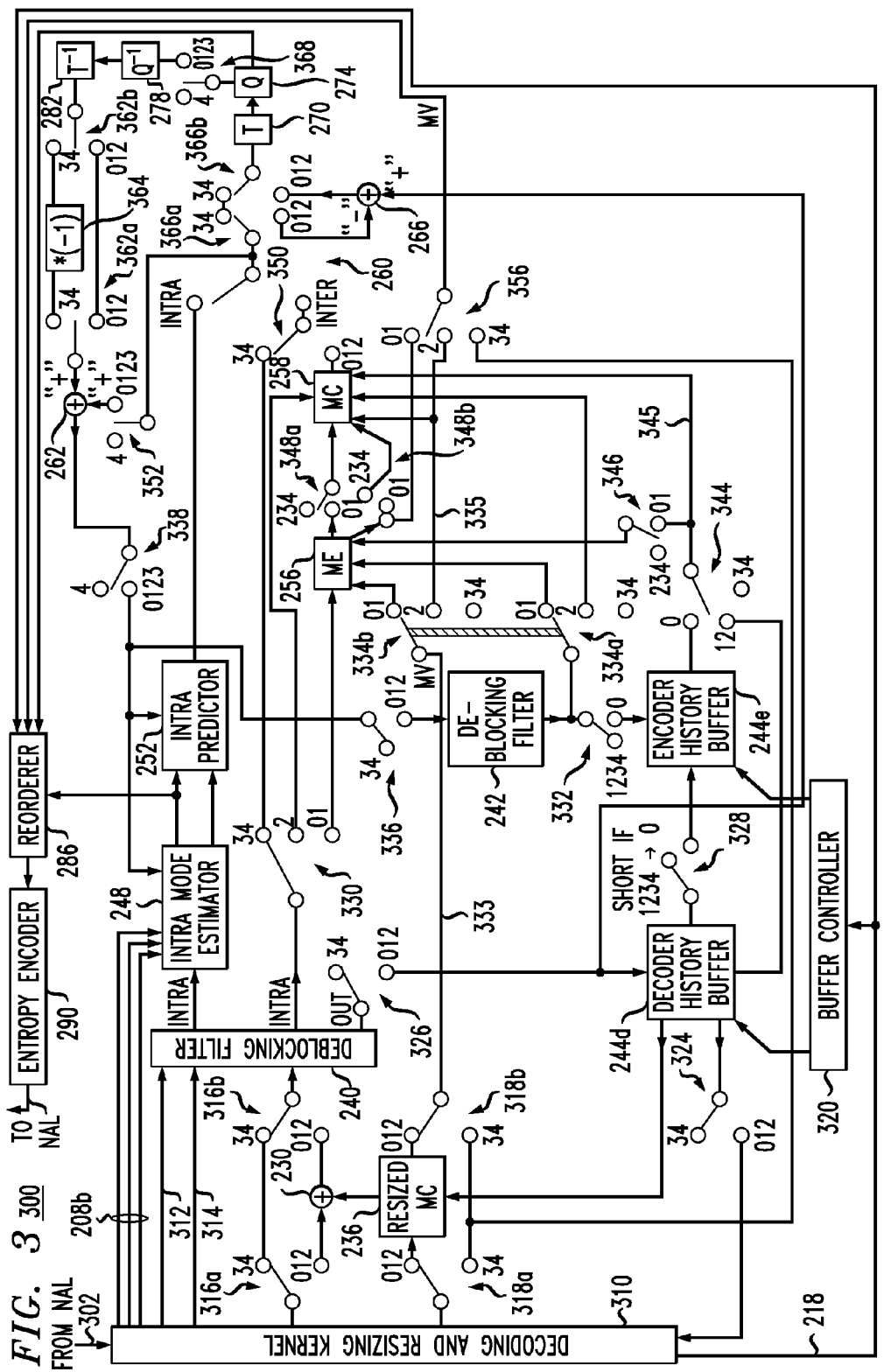
FIG. 3 shows a block diagram of a video transcoder according to yet another embodiment of the invention.

FIG. 3 shows a block diagram of a video transcoder 300 according to yet another embodiment of the invention. Transcoder 300 is generally analogous to transcoder 200 (FIG. 2) and uses many of the same circuit elements and modules. The labeling for these circuit elements/modules is unchanged from FIG. 2. However, unlike FIG. 2, FIG. 3 explicitly shows various logical switches that enable transitions between different operating modes for transcoder 300. Similar to transcoder 200, transcoder 300 supports five operating modes numbered 0 through 4. In FIG. 3, logical-switch terminals have labels that indicate the operating-mode number(s) corresponding to each terminal For example, label "234" means that the corresponding switch terminal is used during each of Mode 2, Mode 3, and Mode 4. As another example, label "01" means that the corresponding switch terminal is used during Modes 0 and 1. As yet another example, label "2" means that the corresponding switch terminal is only used during Mode 2.

A compressed video bit-stream 302 received from the NAL is applied to a decoding/resizing kernel 310. In one embodiment, decoding/resizing kernel 310 comprises: (i) entropy decoder 204; (ii) reorderer 206; (iii) inverse quantizer 210; (iv) demultiplexer switch 212; (v) intra-cache memory 214; (vi) intra resizer 220; (vii) mixed-mode resizer 224; (viii) inter-cache memory 216; (ix) inter resizer 228, and (x) MV-primary resizer 232, all interconnected as shown, e.g., in FIG. 2A. Lines 312 and 314 couple intra resizer 220 and mixed-mode resizer 224, respectively, to deblocking filter 240. Logical switches 316a-b are used to engage or disengage adder 230. Logical switches 318a-b are similarly used to engage or disengage resized-MC module 236. More specifically, both adder 230 and resized-MC module 236 are engaged in Modes 0 through 2 and bypassed in Modes 3 and 4.

Transcoder 300 has a buffer controller 320 that controls history buffers 244d and 244e. Buffer controller 320 supports the functions of a conventional memory controller and executes them as appropriate upon certain mode transitions. For example, buffer controller 320 may send (i) an "initialize buffer" command to decoder history buffer 244d upon a transition from any of Modes 3-4 to any of Modes 0-2 or during a system boot-up into any of Modes 0-2; (ii) a "purge buffer" command to decoder history buffer 244d upon a transition from any of Modes 0-2 to any of Modes 3-4; (iii) a "purge buffer" command to encoder history buffer 244e upon a transition from Mode 0 to any of Modes 1-4; and (iv) a "dismiss frame/block" command to either of the history buffers. The latter command is usually sent out based on frame/block dismissal instructions 218 received from decoding/resizing kernel 310. Buffer controller 320 may also configure either of history buffers 244d and 244e to provide a copy of its contents, via a logical switch 328, to the other history buffer.

Logical switches 324 and 326 are used to connect decoder history buffer 244d to decoding/resizing kernel 310 and deblocking filter 240, respectively. Both of logical switches 324 and 326 are closed (conducting) in Modes 0-2 and open (non-conducting) in Modes 3 and 4. Logical switches 344 and 346 connect history buffers 244d and 244e to ME engine 256. More specifically, logical switch 344 connects (i) encoder history buffer 244e to line 345 in Mode 0 and (ii) decoder history buffer 244d to line 345 in Modes 1 and 2. Logical switch 344 is open in Modes 3 and 4. Logical switch 344 is closed in Modes 0 and 1 and open in Modes 2-4.

Logical switches 332, 334a, and 336 are used to manage the external connections of deblocking filter 242. More specifically, logical switch 332 connects deblocking filter 242 to encoder history buffer 244e in Mode 0 and is open in Modes 1-4. Logical switch 334a connects deblocking filter 242 to (i) ME engine 256 in Modes 0 and 1 and (ii) MC module 258 in Mode 2. Logical switch 334a is open in Modes 3 and 4. Logical switch 334b operates synchronously with logical switch 334a as indicated in FIG. 3. Logical switch 334b connects line 333 to (i) ME engine 256 in Modes 0 and 1 and (ii) line 335 in Mode 2. Logical switch 334b is open in Modes 3 and 4. Logical switch 336 connects deblocking filter 242 to line 337 in Modes 0-2 and is open in Modes 3 and 4.

Logical switches 330, 348a-b, and 350 are used to manage data routing from deblocking filter 240, through or around one or both of ME engine 256 and MC module 258, to multiplexer switch 260. In Modes 3 and 4, logical switches 330 and 350 are configured so that both ME engine 256 and MC module 258 are bypassed. In Mode 2, logical switches 330, 348a-b, and 350 are configured so that only ME engine 256 is bypassed. In Modes 0 and 1, logical switches 330, 348a-b, and 350 are configured to engage both ME engine 256 and MC module 258 in the data processing.

Logical switch 356 is used to connect reorderer 286 to an appropriate source of motion vectors. More specifically, in Modes 0 and 1, logical switch 356 configures reorderer 286 to receive motion vectors from ME engine 256. In Mode 2, logical switches 356, 334b, and 318b configure reorderer 286 to receive motion vectors from resized-MC module 236. In Modes 3 and 4, logical switches 356 and 318a configure reorderer 286 to receive motion vectors from decoding/resizing kernel 310.

Logical switches 338, 352, 362a-b, 366a-b, and 368 are used to manage the two feedback loops, i.e., the reconstruction-path feedback loop and the intra-prediction feedback loop. The description of these feedback loops provided above in reference to FIGS. 2A-2E similarly applies to FIG. 3. Each of logical switches 338, 352, and 368 is closed in Modes 0-3 and open in Mode 4. Logical switches 362a-b are used to engage or disengage a sign inverter 364. More specifically, logical switches 362a-b are configured to (i) exclude sign inverter 364 from the processing path between IDCT module 282 and adder 262 in Modes 0-2 and (ii) include sign inverter 364 in that processing path in Modes 3-4. When sign inverter 364 is engaged, adder 262 in effect operates as a subtractor because the sign inverter changes the sign of one of the adder's inputs. Logical switches 366a-b are used to engage or disengage adder 266. More specifically, logical switches 366a-b are configured to (i) exclude adder 266 from the processing path between multiplexer switch 260 and DCT module 270 in Modes 3 and 4 and (ii) include adder 266 in that processing path in Modes 0-2.

FIG. 4 shows a block diagram of a mixed-mode resizer 400 that can be used as mixed-mode resizer 224 in transcoder 200 (FIG. 2) or transcoder 300 (e.g., as a part of decoding and resizing kernel 310, FIG. 3) according to one embodiment of the invention. Mixed-mode resizer 400 is illustratively shown as being coupled to reorderer 206, intra-cache memory 214, inter-cache memory 216, decoder/shared history buffer 244, and deblocking filter 240 of transcoder 200 (FIG. 2). However, based on the description that follows, one of ordinary skill in the art will be able to configure mixed-mode resizer 400 for use in transcoder architectures that are different from the architecture of transcoder 200.

Mixed-mode resizer 400 receives, via line 404, the original-resolution blocks that are to be fused together to form a corresponding target-resolution block. For various original-resolution blocks, the coding type is also indicated, which can be, e.g., "skip" (i.e., no intra- or inter-prediction coding), "intra coded," "inter coded," etc. Mixed-mode resizer 400 also receives the original-resolution intra modes and motion vectors via lines 406 and 408, respectively. Lines 404-408 are coupled to a coding-decision module 402 designed to determine the coding type for each prospective target-resolution block based on the analysis of received data. The coding type for target resolution blocks can similarly be "skip," "intra coded," "inter coded," etc.

In one embodiment, coding-decision module 402 applies the following exemplary set of rules to analyze the data that appear on lines 404-408:

(A) if all relevant original-resolution blocks have the "skip" coding type, then the coding type for the corresponding target-resolution block is set to "skip";

(B) if $R>R_0$, then the coding type for the target-resolution block is set to "intra coding," where $R_0$ is a positive constant smaller than one; parameter R is defined as $R=(N_{intra}+1)/(N_{inter}+1)$; $N_{intra}$ is the number of intra-predicted original-resolution blocks; and $N_{inter}$ is the number of inter-predicted original-resolution blocks;

(C) if all motion vectors of the relevant inter-predicted original-resolution blocks point to neighboring blocks, then the coding type for the target-resolution block is set to "inter coding;"

(D) if all motion vectors corresponding to inter-predicted original-resolution blocks are oriented within an angular sector having a selected, relatively narrow angular width, then the coding type for the corresponding target-resolution block is set to "inter coding;"

(E) if none of rules (A)-(D) is satisfied, then the coding type for the target-resolution block is set to "intra coding."

Rules (A)-(E) are hierarchical and have a decreasing priority going from rule (A) to rule (E), meaning that any particular rule is used for making the coding decision only if all higher-priority rules are not applicable to the set of original-resolution blocks in question. In alternative embodiments, other rule sets can similarly be used in coding-decision module 402.

If coding-decision module 402 determines that the coding type for the target-resolution block is going to be "intra coding," then the coding-decision module sends an enable signal 418 to an intra-mode selector 420. Alternatively, if coding-decision module 402 determines that the coding type for the target-resolution block is going to be "inter coding," then the coding-decision module sends an enable signal 428 to an inter-mode selector 430.

Intra-mode selector 420 analyzes the original-resolution blocks and the original-resolution intra modes received via lines 404 and 406, respectively, and predicts an intra mode that is most likely to be used for encoding the corresponding target-resolution block in the encoder portion of the transcoder. The predicted intra mode is communicated, via line 422, to a switch controller 440. In one embodiment, the predicted intra mode can also be used as an initial intra-mode approximation in the intra-prediction feedback loop (see, e.g., feedback signal 246 in FIG. 2A).

Inter-mode selector 430 analyzes the original-resolution blocks and the original-resolution motion vectors received via lines 404 and 408, respectively, and selects a reference block for inter-prediction coding based on said analysis. Inter-mode selector 430 then computes an estimated motion vector corresponding to the selected reference block. The selected reference block and the computed motion vector are communicated, via lines 432 and 434, respectively, to switch controller 440.

Switch controller 440 uses the data received via lines 422, 432, and 434 to select a suitable resizer $452_i$ from a bank 450 of resizers $452_1$-$452_P$. The selection can be based, e.g., on (i) the type of coding selected for the target-resolution block by coding-decision module 402, (ii) relative geometric positions in the original-resolution frame of the inter- and intra-predicted blocks that are to be fused together to form a corresponding target-resolution block, (iii) the predicted intra mode, and (iv) the estimated motion vector(s). Switch controller 440 then configures switches 448 and 454 to direct the mixed-mode resizing processing through the selected resizer $452_i$. The output of the selected resizer $452_i$ becomes the output of mixed-mode resizer 400.

Bank 450 has P different resizers 452, where P is a positive integer greater than one. Each individual resizer 452 is designed and configured to handle the corresponding specified range(s), set(s), and/or ensemble(s) of (i) relative inter-predicted and intra-predicted block positions within the frame, (ii) intra modes, and/or (iii) motion vectors. After being selected by switch controller 440, resizer $452_i$ receives the above-described data transmitted via lines 404-408. In addition, resizer $452_i$ receives (i) reference blocks and blocks of residuals for intra-prediction coding, e.g., from intra-cache memory 214, (ii) blocks of residuals for inter-prediction coding, e.g., from inter-cache memory 216, and/or (iii) reference blocks for motion compensation, e.g., from history buffer 244. Note that the reference blocks and blocks of residuals for intra-prediction coding and the blocks of residuals for inter-prediction coding have the original resolution while the reference blocks for motion compensation have the target resolution. Using the received data, resizer $452_i$ performs a corresponding resizing operation to generate a resized block for transfer, e.g., to deblocking filter 240. Depending on the particular embodiment of the transcoder in which mixed-mode resizer 400 is deployed, individual resizers 452 can be designed to operate in the spatial domain or in the transform domain.

As used herein, the term "processing path" refers to one or more processing modules, blocks, and/or elements of a transcoder that are (i) operatively connected to one another, if there are more than one of them, and (ii) coupled between at least two logical switches, wherein each of said at least two logical switches may be one of logical switches 192, 194, and/or 196. Multiple explicit examples of "processing paths" can be found, e.g., in FIG. 3. A first representative example of a "processing path" shown in FIG. 3 comprises resized-MC module 236, which is coupled between logical switch 318*a* and logical switch 318*b*. A second representative example of a "processing path" shown in FIG. 3 comprises inverse quantizer 278 and IDCT module 282, which are coupled between logical switch 368 and logical switch 362*b*. A third representative example of a "processing path" shown in FIG. 3 comprises history buffer 244*d*, history buffer 244*e*, and MC module 258, which are coupled between logical switch 324 and logical switch 350. One skilled in the art will be able to find several additional examples of processing paths in FIG. 3.

As used herein, the term "block" refers to an image-compression component used in video compression. A block (also often referred to in the literature as "macroblock") comprises two or more pixels. More specifically, the particular size of a block depends on the codec and is usually a multiple of four pixels. The most frequently used block sizes are 4×4, 8×8, and 16×16 pixels. A block may also have a rectangular shape, with the height being 4, 8, 12, or 16 pixels and the width being 4, 8, 12, or 16 pixels, wherein the height is different from the width. For the purposes of this specification, the terms "block" and "macroblock" should be regarded as interchangeable.

Color information may be encoded at a lower resolution than the luminance information. For example, the color information of an 8×8 block in a 4:1:1 color space is encoded using a YCbCr format, wherein the luminance is encoded in an 8×8 pixel format while the difference-red and difference-blue information is encoded in a 2×2 pixel format.

As known in the art, the term "spatial resolution" generally refers to the amount of detail that an image holds. Higher spatial resolution typically corresponds to more image detail. Image resolution can be measured in various ways. For example, image resolution can be used to quantify how close two lines can be to each other to still be perceived as separate lines in the image. Resolution units can be tied to physical sizes (e.g., lines per inch), to the overall size of a picture (e.g., lines or pixels per height/width of the picture), or to angular subtenant. Line pairs are often used instead of lines, with a line pair comprising a dark line and an adjacent light line. In television, a resolution of ten lines per millimeter means five dark lines alternating with five light lines per millimeter. In digital imaging, resolution is usually tied to the pixel count in an image. More specifically, it is often said that an image has a vertical resolution of N pixels and a horizontal resolution of M pixels, e.g., 640×480 pixels. Another popular convention is to cite resolution as the total number of pixels in the image, which is calculated by multiplying the number of pixel columns by the number of pixel rows. Other conventions include describing resolution in pixels per length unit or pixels per area unit, such as pixels per inch or pixels per square inch.

In various embodiments, an "integer transform" can be employed, as known in the art, instead of or in addition to the DCT transform, e.g., in modules 270 and 282. A transcoder of the invention can have fewer or more than five operating modes.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

A person of ordinary skill in the art would readily recognize that steps of various above-described methods can be performed by programmed computers/processors. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media, such as magnetic disks or tapes, hard drives, or optically readable digital data storage media.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A method of resizing digital video, the method comprising:
    processing a first compressed video bit-stream using a plurality of processing modules to generate a second compressed video bit-stream, wherein:
        the first compressed video bit-stream has a first spatial resolution; and
        the second compressed video bit-stream has a second spatial resolution, the second spatial resolution being different from the first spatial resolution; and
    changing a configuration of the plurality of processing modules to change an amount of computational resources allocated to said processing; and wherein the step of processing comprises:
  partially decoding the first compressed video bit-stream to generate partially decoded video data;
  demultiplexing the partially decoded video data to generate first data segments for intra-mode resizing in a first resizer, second data segments for mixed-mode resizing in a second resizer, and third data segments for inter-mode resizing in a third resizer, said first, second, and third resizers being configured to operate in parallel with one another; and
  resizing the first, second, and third data segments in parallel using the first, second, and third resizers, respectively, wherein:
    the first, second, and third data segments represent respective image portions at the first spatial resolution; and
    the resizing produces data segments that represent said respective image portions at the second spatial resolution.

2. The method of claim 1, wherein, while said changing is being performed, said processing continuously produces, from a sequence of video frames of the first compressed video bit-stream, a corresponding sequence of video frames for the second compressed video bit-stream.

3. The method of claim 1, wherein no incoming video frame is being skipped, discarded, or dropped from said processing due to the change in the configuration of the plurality of processing modules.

4. The method of claim 1, wherein the step of changing comprises:
  changing data flow from flowing through a first processing module to flowing through a different second processing module, wherein data does not flow through the first processing module after said change.

5. The method of claim 1, wherein the step of changing comprises one or both of:
  changing a size of a buffer configured to store reference blocks for inter-prediction coding and/or intra-prediction coding at the second spatial resolution; and
  engaging or disengaging one or more of a deblocking filter, a motion-estimation engine, and a motion-compensation module, each configured to operate on blocks having the second spatial resolution.

6. The method of claim 1, wherein:
  each of the second data segments comprises at least one intra-predicted block and at least one inter-predicted block; and
  the resizing of each of the second data segments in the second resizer produces a respective resized data segment that is generated using either intra-prediction coding or inter-prediction coding, but not both.

7. The method of claim 1, wherein the step of processing further comprises:
  removing intra-prediction coding and inter-prediction coding from resized data segments to generate a first set of reference blocks having the second spatial resolution;
  storing said first set in a first buffer;
  subjecting said first set to feedback-loop processing to generate a corresponding second set of reference blocks having the second spatial resolution; and
  storing said second set in a second buffer.

8. The method of claim 7, wherein:
  the first set comprises a first reference block;
  the second set comprises a second reference block; and
  the first block and the second block correspond to a same image portion at the second spatial resolution, but have different respective levels of residual errors.

9. The method of claim 7, wherein, for each block from the first set, the second set has a corresponding block, with said two blocks being approximations of each other characterized by different respective levels of residual errors.

10. The method of claim 7, wherein:
  said feedback-loop processing comprises two or more feedback-loop cycles, each comprising motion-vector refinement to reduce residual errors corresponding to the second set; and
  the second set is updated in the second buffer after each feedback-loop cycle.

11. The method of claim 7, wherein said feedback-loop processing comprises a quantization operation and an inverse-quantization operation, but no discrete-cosine or integer transform and no inverse discrete-cosine or integer transform.

12. The method of claim 7, wherein said feedback-loop processing comprises (i) a quantization operation and an inverse-quantization operation and (ii) a discrete-cosine or integer transform and an inverse discrete-cosine or integer transform.

13. The method of claim 1, wherein the mixed-mode resizing in the second resizer comprises generating, from a respective one of the second data segments, a fourth data segment of compressed video data, wherein:
  the respective one of the second data segments represents an image portion at the first spatial resolution;
  the fourth data segment represents said image portion at the second spatial resolution;
  the respective one of the second data segments comprises at least one intra-predicted block and at least one inter-predicted block; and
  the fourth data segment comprises either one or more intra-predicted blocks or one or more inter-predicted blocks, but not both.

14. The method of claim 13, wherein the mixed-mode resizing in the second resizer further comprises:
  determining a coding type for the fourth data segment based on one or more reference blocks, one or more intra modes, and one or more motion vectors identified by the respective one of the second data segments;
  selecting a resizer from a bank of resizers based on one or more of (i) the determined coding type, (ii) relative geometric positions of inter- and intra-predicted blocks in an image portion represented by the respective one of the second data segments, (iii) an intra mode predicted for the fourth data segment, and (iv) a motion-vector estimate for the fourth data segment, wherein the second resizer includes said bank of resizers; and
  processing the respective one of the second data segments in the selected resizer of the bank of resizers to generate the fourth data segment.

15. The method of claim 14, wherein different resizers in the bank of resizers differ from one another by at least one of (i) a corresponding nominal range, set, or ensemble of intra modes and (ii) a corresponding nominal range, set, or ensemble of motion vectors.

16. The method of claim 1, further comprising:
  receiving the first compressed video bit-stream from a remote encoder via a Network Abstraction Layer; and
  applying the second compressed video bit-stream to the Network Abstraction Layer for being transported to a remote decoder.

17. The method of claim 1, wherein the step of processing comprises one or both of:

deleting one or more peripheral rows and/or columns of pixels in a picture corresponding to the first compressed video bit-stream; and inserting one or more empty peripheral rows and/or columns of pixels in a picture corresponding to the second compressed video bit-stream.

18. The method of claim 1, wherein the method supports an H.264 standard.

19. An apparatus, comprising:

a decoding and resizing kernel configured to partially decompress a first compressed video bit-stream to generate partially decompressed video data;

a plurality of processing modules configured to process the partially decompressed video data;

an encoding kernel configured to compress the partially decompressed data that have been processed by said plurality of processing modules to generate a second compressed video bit-stream, wherein:

the first compressed video bit-stream has a first spatial resolution;

the second compressed video bit-stream has a second spatial resolution, the second spatial resolution being different from the first spatial resolution; and a controller operatively coupled to the plurality of processing modules and adapted to change a configuration of said plurality of processing modules in response to a request to change an amount of computational resources allocated by the apparatus to a process of generating the second compressed video bit-stream from the first compressed video bit-stream; and wherein the decoding and resizing kernel comprises a first resizer, a second resizer, and a third resizer configured to operate in parallel with one another; and wherein the decoding and resizing kernel and the plurality of processing modules are further configured to:

partially decode the first compressed video bit-stream to generate partially decoded video data;

demultiplex the partially decoded video data to generate first data segments for intra-mode resizing in the first resizer, second data segments for mixed-mode resizing in the second resizer, and third data segments for inter-mode resizing in the third resizer; and resize the first, second, and third data segments in parallel using the first, second, and third resizers, respectively, wherein:

the first, second, and third data segments represent respective image portions at the first spatial resolution; and the resizing produces data segments that represent said respective image portions at the second spatial resolution.

20. The apparatus of claim 19, wherein the decoding and resizing kernel comprises first, second, and third parallel resizing channels, wherein:

the first resizing channel comprises an intra-cache memory and the first resizer, wherein the intra-cache memory is configured to temporarily store the first data segments prior to providing said temporarily stored first data segments to the first resizer for said intra-mode resizing therein;

the third resizing channel comprises an inter-cache memory and the third resizer, wherein the inter-cache memory is configured to temporarily store the third data segments prior to providing said temporarily stored third data segments to the third resizer for said inter-mode resizing therein; and the second resizing channel comprises the second resizer, wherein the second resizer is configured to resize each of the second data segments using either intra-prediction coding or inter-prediction coding, but not both, with a respective one of the intra-prediction coding or inter-prediction coding selected for each of the second data segments based on intra-mode residuals received from the intra-cache memory and inter-mode residuals received from the inter-cache memory.

* * * * *